(12) United States Patent
Yaeger (10) Patent No.: US 7,117,209 B2
(45) Date of Patent: Oct. 3, 2006

(54) RECORD TRIMMING METHOD, APPARATUS, AND SYSTEM TO IMPROVE PROCESSING IN A SORT UTILITY

(75) Inventor: Frank L. Yaeger, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 10/402,699

(22) Filed: Mar. 28, 2003

(65) Prior Publication Data

US 2004/0193618 A1    Sep. 30, 2004

(51) Int. Cl.
*G06F 17/00* (2006.01)

(52) U.S. Cl. .................... 707/7; 707/104.1

(58) Field of Classification Search .......... 707/101, 707/3, 100; 364/200, 900, 639; 395/602; 708/499; 370/473; 700/100, 1
See application file for complete search history.

(56) References Cited

U.S. PATENT DOCUMENTS

| | | | |
|---|---|---|---|
| 4,272,810 A | 6/1981 | Gates et al. | 379/88.03 |
| 4,727,506 A | 2/1988 | Fling | 708/551 |
| 4,809,166 A | 2/1989 | Cooper | 345/501 |
| 5,799,184 A | 8/1998 | Fulton et al. | 707/2 |
| 6,044,391 A | 3/2000 | Chao et al. | 708/499 |
| 6,172,988 B1 | 1/2001 | Tiernan et al. | 370/473 |

OTHER PUBLICATIONS

Dianna Lorentz http://www.oreilly.com/catalog/orbestprac/chapter/ch04.html 2002, oreilly, version 9.2, p. 1-2.*
Steven Feuerstein http://www.oreilly.com/catalog/orbestprac/chapter/ch04.html 2001, p. 10-11.*
Saman Amarasinghe Fall 2002 Lecture 16:Register Allocation , pp. 1-3.*

* cited by examiner

*Primary Examiner*—Apu Mofiz
(74) *Attorney, Agent, or Firm*—Kunzler & Associates

(57) ABSTRACT

Control statements related to record input, output, filtering, and formatting in a data processing system are scanned by a parser to find one or more trimming control parameters referenced in the control statements. A record trimming module scans selected data records backwards beginning at the end of the record. A record length associated with a data record is decremented as trailing values that match a value specified in the trimming control parameters are trimmed from the processed records. Processed data records are output to a specified file. The present invention increases the efficiency of processing data records within data processing applications such as pipelined sort utilities.

18 Claims, 6 Drawing Sheets

(Prior Art)

Fig. 1

(Prior Art)

```
             510   520    530    540   550   552    554
              )     )      )      )     )     )      )
500 →    OUTFIL  FNAMES = NameList , FTOV, VLTRIM = Format Value
                                └──┬──┘└──────┬──────┘
                                Optional   Optional
```

530 ⌇ *NameList* - List of names of output datasets or files

552 ⌇ *Format* - Desired format of data values

554 ⌇ *Value* - Desired data value

```
             510   520    530    540   550   552    554
              )     )      )      )     )     )      )
560 →    OUTFIL  FNAMES = MYFILE, FTOV, VLTRIM = C'*'
```

Fig. 5

SORTIN

620 → OUTFIL FNAMES = DS1 FTOV
         510      520      530  540

DS1

640 → OUTFIL FNAMES = DS2 FTOV VLTRIM = C'*'
         510      520      530  540  550   552  554

RECORD TRIMMING METHOD, APPARATUS, AND SYSTEM TO IMPROVE PROCESSING IN A SORT UTILITY

BACKGROUND OF THE INVENTION

1. Field of the Invention

The invention relates to methods, apparatus, and systems for improved data processing. Specifically, the invention relates to methods, apparatus, and systems for trimming specified data values from data records within a sort utility.

2. Description of Related Art

Record sorting is a necessary and useful utility within data processing systems. Sorting facilitates the ordering of data records in a manner useful for processing applications such as searching data records, generating billing statements, creating reports, compiling directories, and the like. The ability to sort data records using one or more selected fields as a sorting key facilitates intelligent processing of data records.

While sorting is a useful operation, sorting data records and conducting operations associated therewith can consume large amounts of computational capacity, particularly when dealing with files containing a large quantity of data records.

Pipelined sorting systems have been developed to meet the performance demands of applications that process large files. Pipelined sorting systems achieve increased performance by partitioning a problem into stages, where each stage focuses processing resources on specific tasks. Typically, data records in the form of files are fed one record at a time into a processing pipeline. As each pipeline stage finishes processing a data record, the data record may be passed onto a subsequent stage for further processing.

Execution flexibility is one advantage of pipelined processing systems. The processing stages that are ready for execution may be distributed to available processors, while processing stages that are blocked may be suspended to provide processing capacity to other stages.

To increase processing efficiency, control statements associated with a set of data records may be parsed and packed into one or more control blocks prior to actual processing. The control blocks configure the various processing stages of a processing pipeline and facilitate efficient execution. Pipeline stages that are not referenced within control statements are preferably bypassed to eliminate unneeded record handling. The ability to control pipeline stages via control statements essentially provides a job-configurable virtual machine useful to developers and users of pipelined applications and utilities.

In addition to sorting, pipelined sorting systems may include features for selectively processing data records as directed by control statements associated with a set of data records. For example, IBM®'s DFSORT™ utility supports control statements corresponding to a skip stage, a user supplied input stage, a filtering stage, a stop stage, a first reformatting stage, a sort, copy, or merge stage, a second reformatting stage, a user supplied output stage, and one or more supplemental stages.

The skip stage skips or discards a selected number of the data records before passing unskipped records onto the rest of the pipeline. The user supplied input stage facilitates customized processing on the unskipped records or data records provided from programmable sources. The filtering stage filters the data records such that selected records are passed on to the remainder of the pipeline, while other records are discarded or redirected.

The stop stage passes a specified number of the data records to the remainder of the pipeline and thereby limits subsequent processing, such as sorting, to a specified number of data records. The first reformatting stage reformats data records and passes the formatted records to the sort, copy or merge stage. The second reformatting stage may also be used to apply additional formatting operations to the data records subsequent to the sort, copy or merge stage.

The user supplied output stage facilitates execution of customized processing on and data output of the processed data records. The supplemental processing stage may be used to conduct specialized formatting and reporting operations in order to generate multiple forms of output related to a set of data records.

The various stages included in the aforementioned sort utility were developed in response to the needs of developers and users. Each pipeline stage executes in an efficient manner and adds to the flexibility and power of the sort utility. The ability to draw upon the power and efficiency of the utility via control statements severely reduces the programming burden associated with creating customized applications such as generating billing statements, publishing directories, creating reports, and the like.

Typically, files processed by a sorting utility such as the aforementioned pipelined sort utility contain either fixed-length records or variable-length records. The processing burden associated with processing data records is directly proportional to the length of the records. The ability to shorten data records potentially reduces the bandwidth requirements, memory utilization, and computational load associated with sorting records.

Often, files that are sorted by a pipelined sort utility contain repeating trailing values such as asterisk characters, or data blanks at the end of many records. These trailing values increase the length of the file and often reduce data processing performance. The elimination of unnecessary trailing values from records would decrease the processing burden associated with those records. What is needed are methods and associated apparatus to identify and trim trailing values from data records and thereby improve the performance and reduce the processing requirements associated with processing data records within high performance processing applications such as a pipelined sort utility.

SUMMARY OF THE INVENTION

The methods and apparatus of the present invention have been developed in response to the present state of the art, and in particular, in response to the problems and needs in the art that have not yet been fully solved by currently available data processing methods and apparatus. Accordingly, the present invention provides an improved method, apparatus, and system for identifying and trimming data elements having a specified value from data records processed within a data processing system.

In order to clearly communicate the utility and versatility of the present invention the term 'value' is used within this disclosure to generically refer to a specific data pattern stored within a data element. The values stored within data elements may be numeric values, character values, bit values, or any data pattern appropriate to the data elements within a data record, data structure, or the like.

In one aspect of the present invention, control statements such as those related to record input, record output, record filtering, and record formatting are scanned to find control statements related to trimming data values from data records. One or more trimming control parameters are found within the control statements and used to direct trimming operations. Subsequently, the length of a record is determined previous to trimming the record. In one embodiment, the length of the data record is determined from a record descriptor word found at the beginning of each data record.

In response to determination of the record length, the data record is scanned backwards from the end of the data record comparing each data element with a value specified in the trimming control parameters. Each time the scanned data element matches the value specified in the trimming control parameters, the scanned data element is removed from the data record. In one embodiment, the length of the data record is decremented as each data element is scanned and removed. Each data element in the data record is scanned until the value of the data element and the value specified in the trimming control parameter are not identical. The data record with the modified length is then provided to subsequent processing stages.

The various elements of the present invention are combined into a system for processing data records. In one embodiment, the system for processing data records includes a computer configured to execute control statements, a sort utility configured to input, process, and output a plurality of data records, and a record trimming module configured to eliminate trailing data values within data records. In one embodiment, the system includes a parser configured to scan the control statements.

In one embodiment, the record trimming module is further configured to determine the length of the data records, scan a data record backwards from the end of the record, remove data elements having a value that matches the value specified in the trimming control parameters until the value of the data element and the value specified in the trimming control parameters are not identical, and to change the length of the data record by decrementing a register containing the length of the data record.

The present invention also includes an improved record set trimming method. In one embodiment, the improved record set trimming method includes the steps of scanning control statements associated with a set of data records, finding one or more trimming control parameters referenced in the control statements, determining the length of each data record, scanning each data record backwards starting at the end of the record, trimming each data element in the data record having a value that matches the value specified in the trimming control parameters until the two values are not identical, changing the length of each data record as data elements are removed from the data record, and storing the new data record in readily accessible locations such as a data register or storage cache.

The present invention reduces the storage, bandwidth, and computational load associated with data records. These and other objectives, features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Many of the functional units described in this specification have been labeled as modules, in order to more particularly emphasize their implementation independence. For example, modules may be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. For example, a module of executable code could be a single instruction, or many instructions, and may even be distributed over several different code segments, among different programs, and across several memory devices.

Modules may also be implemented in hardware as electronic circuits comprising custom VLSI circuitry, off-the-shelf semiconductors such as logic chips, transistors, or other discrete components. A module may also be implemented in programmable hardware devices such as field programmable gate arrays, programmable array logic, programmable logic devices or the like.

Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
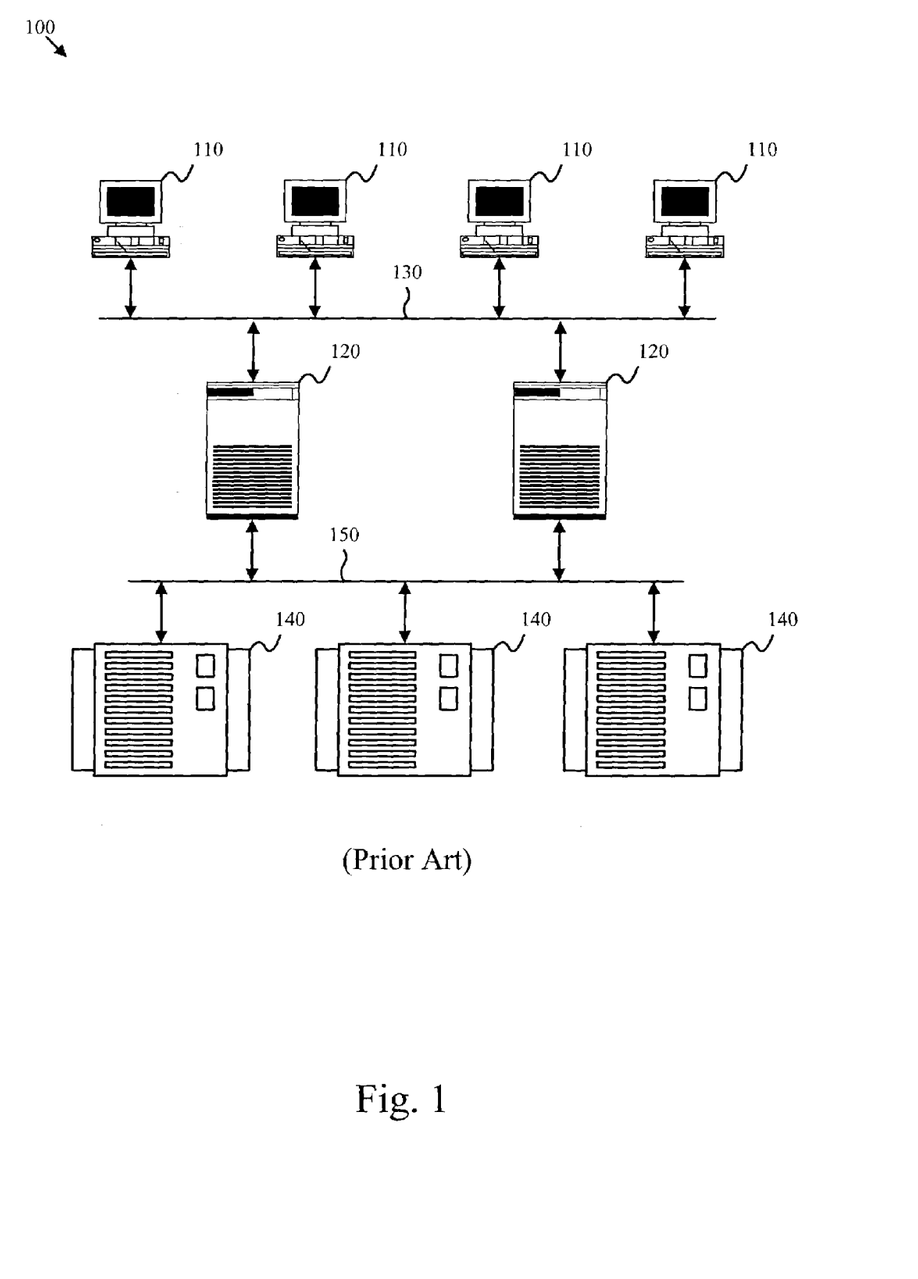
FIG. 1 is a block diagram illustrating a representative data processing system.

Referring to FIG. 1, a data processing system 100 is depicted that is representative of an environment in which the present invention may be deployed. The depicted data processing system 100 includes terminals or workstations 110 interconnected with one or more computers 120 via a network 130. The network 130 may be a local area network and/or a wide area network. Computers 120 may include mainframe computers.

The depicted data processing system 100 also includes one or more storage subsystems 140 interconnected with computers 120 via a storage network 150. The mainframe computers 120 are preferably configured to conduct high bandwidth input and output (I/O) with the storage subsystems 140. The storage subsystems 140 may include redundant components such as storage controllers and storage devices in order to increase reliability.

Figure 2:
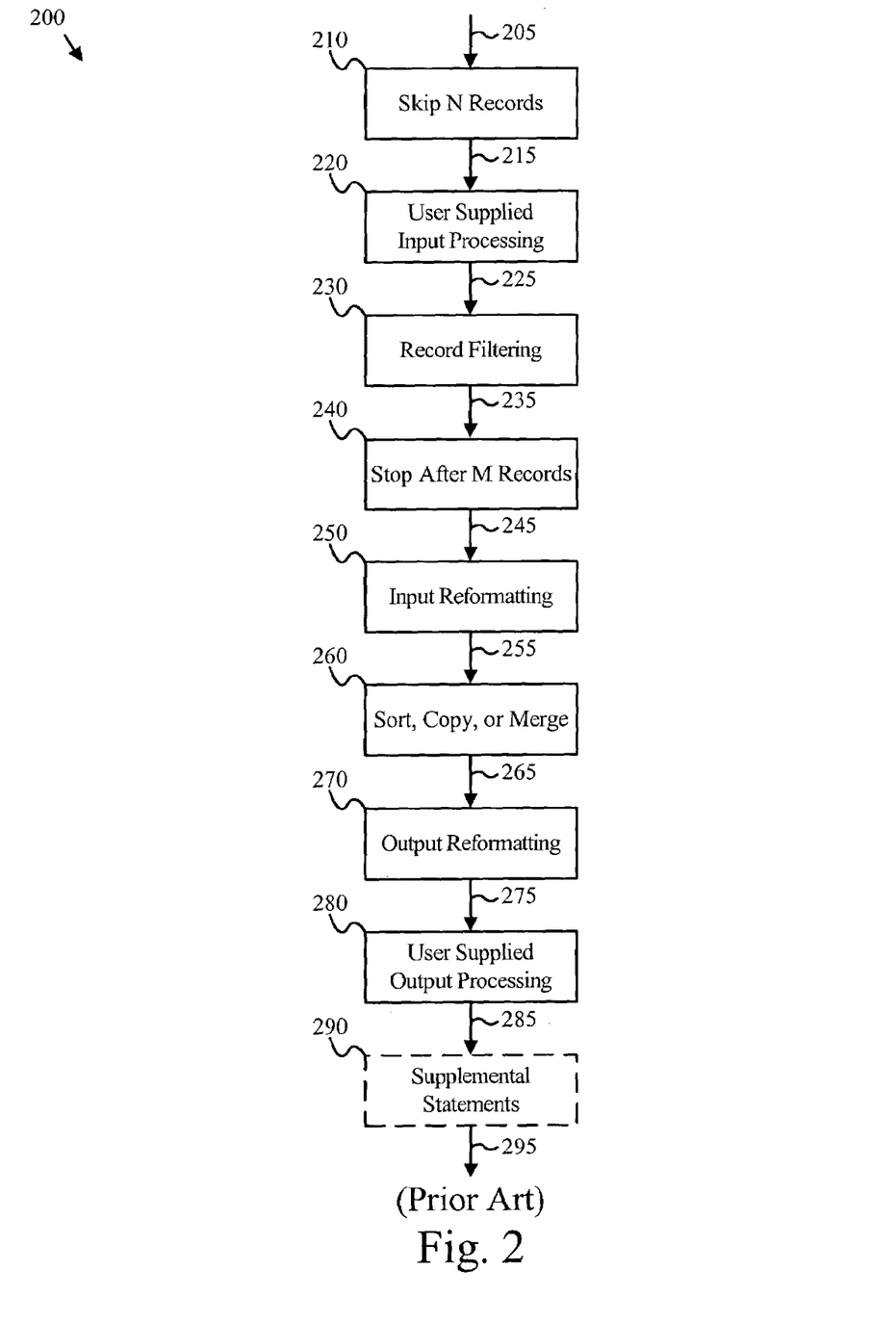
FIG. 2 is a data flow diagram illustrating one embodiment of a prior art data processing pipeline.

FIG. 2 is a data flow diagram of a prior art data pipeline 200 exemplary of the environment wherein the present invention may be deployed. The depicted diagram shows the preferred relationship of various processing stages of the data pipeline 200. The depicted data pipeline 200 of the depicted embodiment is essentially a job-configurable virtual machine that executes on a computer such as the mainframe 120 depicted in FIG. 1.

The data pipeline 200 facilitates efficient record-oriented processing such as copying, filtering, sorting, summing, formatting, and reporting on data records. Although the present invention was developed in response to the needs of the data pipeline 200 on the mainframe 120, the present invention may be deployed separately from the data pipeline 200 and the mainframe 120.

The data pipeline 200 processes data as directed by various control statements corresponding to the processing stages of the data pipeline 200. In one embodiment, multiple control statements corresponding to a set of data records are parsed and packed into one or more control blocks (not shown). The control blocks configure the various processing stages of the data pipeline 200 and facilitate execution of a scheduled job.

Typically, a set of data records 205 in the form of a file is fed one record at a time into the pipeline 200. However, each pipeline stage may process multiple records concurrently, particularly those stages that compare data from multiple records, such as the sort stage 260. Pipeline stages that are not used are preferably bypassed such that records from a previous stage are provided to a subsequent stage without processing by the bypassed stage.

As depicted, the data pipeline 200 includes a skip stage 210, a user supplied input stage 220, a filtering stage 230, a stop stage 240, a reformatting stage 250, a sort stage 260, a reformatting stage 270, a user supplied output stage 280, and one or more supplemental stages 290. Stages 210–250, and 270–290 are optional in that stages that are not referenced by control statements are bypassed within the data pipeline 200. For illustration purposes, the following description generally assumes that each stage is used within the data pipeline 200.

The skip stage 210 skips or discards a selected number of the data records 205 before passing unskipped records 215 onto the next stage of the data pipeline 200. A user supplied input stage 220 facilitates conducting user supplied processing routines on the unskipped records 215 and provides one or more data records 225. In one embodiment, the data pipeline 200 may be configured to receive data records 225 directly from the user supplied input stage 220 without use of the skip stage 210.

The filtering stage 230 filters the data records 225 such that selected records 235 are passed on to the remainder of the pipeline 200, while other records are discarded. The record filtering accomplished by the filtering stage 230 preferably occurs as directed by control statements associated with record filtering.

The stop stage 240 receives the selected records 235 from the filtering stage 230. The stop stage 240 passes a selected number of the data records 245 to the remainder of the data pipeline 200. In one embodiment, the selected number of data records 245 is indicated by a control block created from one or more control statements associated with a set of data records. After the selected number of records 245 have been supplied to the remainder of the data pipeline 200, the stop stage 240 indicates an end of data condition to the next stage in the data pipeline 200.

The reformatting stage 250 reformats data within the records 245 and passes formatted records 255 to the sort stage 260 which in turn provides sorted records 265. In addition to sort operations, the sort stage 260 may also be configured to merge or copy data records as specified by the control statements associated with the records being processed. The reformatting stage 270 applies additional formatting operations to the sorted records 265 to provide one or more formatted records 275.

The formatted records 275 are fed to the user supplied output stage 280. Upon completion of the customized processing provided by the user supplied output stage 280, one or more data records 285 are passed either to the supplemental processing stage 290, or alternately, directly to an output file 295. The supplemental processing stage 290 is configured to conduct multiple passes on the data records 285 and conduct specialized formatting and reporting operations in order to generate multiple forms of output related to the set of data records.

Figure 3:
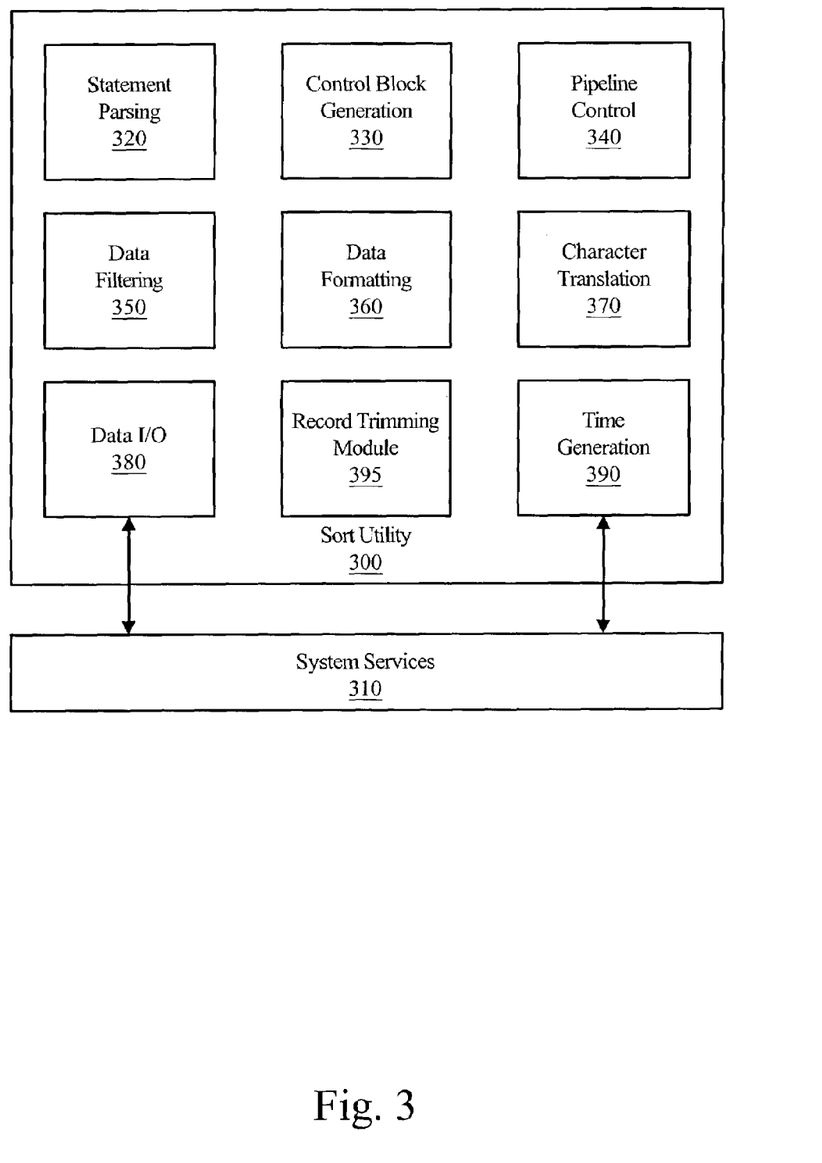
FIG. 3 is a block diagram illustrating one embodiment of a sort utility in accordance with the present invention.

FIG. 3 is a block diagram illustrating selected modules of a sort utility 300 in accordance with the present invention. The sort utility 300 provides record-oriented processing services such as sorting, merging, copying, summing, and formatting of data records. In one embodiment, the sort utility 300 is configured to provide record-oriented processing services to system utilities, operating system extensions, programming languages, applications, and the like.

In the depicted embodiment, the sort utility 300 includes a variety of modules useful for record-oriented processing. The functionality of the modules within the sort utility 300 is increased by the use of system services 310 such as those available within an operating system such as IBM®'s z/OS or OS390. The modules depicted in FIG. 3 include a statement parsing module 320, a control block generation module 330, a pipeline control module 340, a data filtering module 350, a data formatting module 360, a character translation module 370, a data I/O module 380, a time generation module 390, and a record trimming module 395.

The sort utility 300 receives a set of control statements (not shown) that in one embodiment are used to configure the data pipeline 200 depicted in FIG. 2 via one or more control blocks (not shown). The statement parsing module 320 parses the control statements to ascertain various options and parameters related to the processing stages of the data pipeline 200. The control block generation module 330 encodes the parsed options and parameters into the control blocks used to configure the data pipeline 200.

The pipeline control module 340 coordinates execution and the movement of data between the stages of the data pipeline 200. As a data record finishes a pipeline stage it is directed to a subsequent stage. The data filtering module 350 includes or omits data records for subsequent processing based on conditions specified in control statements. The data I/O module(s) 380 provide I/O services to the sort utility 300 such as retrieving records to feed the pipeline and storing records processed by the pipeline.

The data formatting module 360 provides services that facilitate formatting data fields into forms appropriate for processing and/or inclusion into data records. The time generation module 390 is closely related to the data filtering module 350 and the data formatting module 360. The time generation module 390 conducts methods that efficiently generate time constants into a plurality of formats. The character translation module 380 facilitates translating selected characters within fields and records to a desired character set. The record trimming module 395 coordinates the removal of trailing data values from data records.

Figure 4:
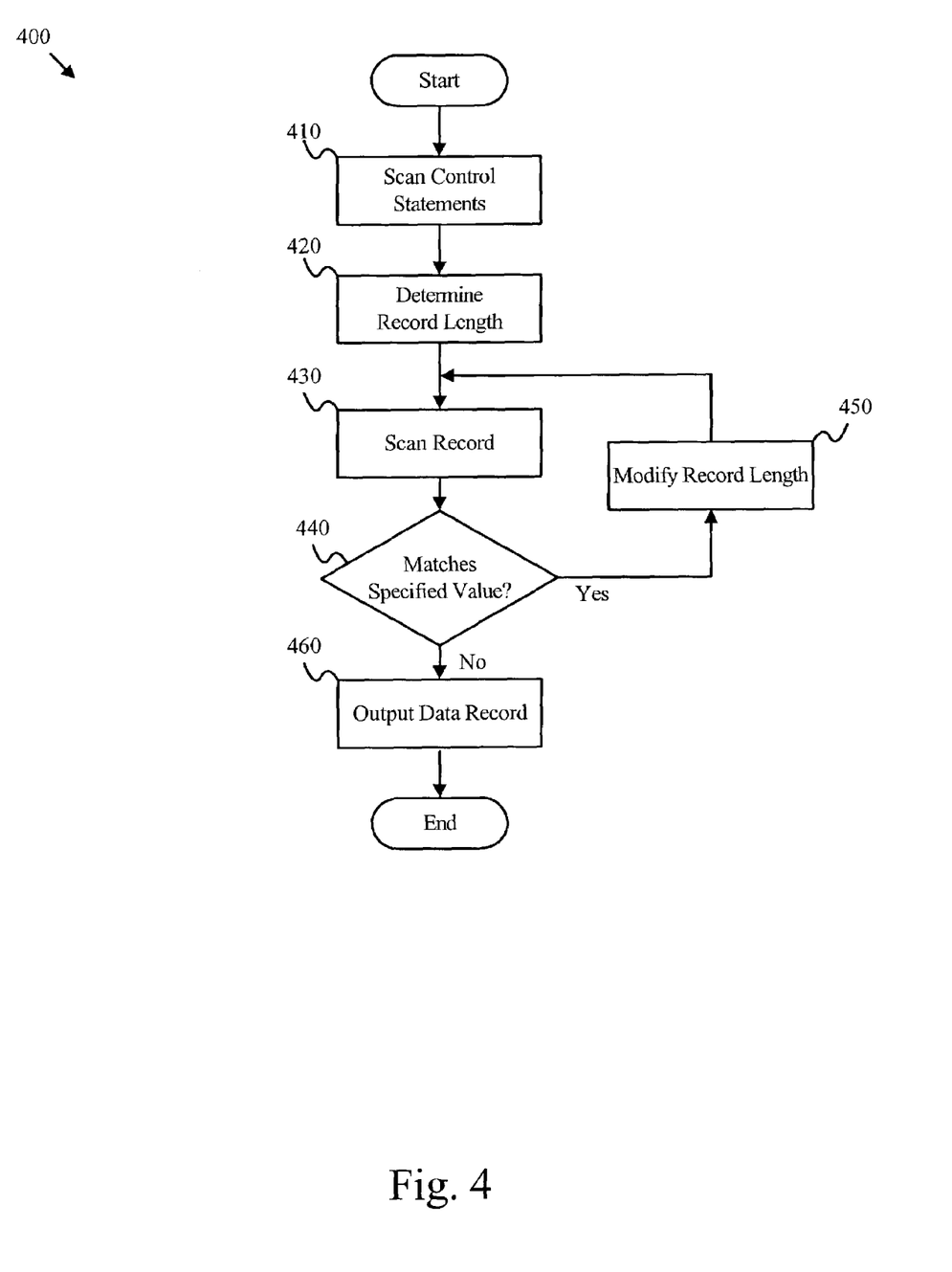
FIG. 4 is a flow chart illustrating one embodiment of a record trimming method of the present invention.

FIG. 4 is a flow chart illustrating one embodiment of a record trimming method 400 of the present invention. The record trimming method 400 may be conducted in conjunction with the record trimming module 395. Data elements such as bytes, words, integers, floating point numbers, and the like, having a specified value may be trimmed from records using the record trimming method 400. For example, trailing data values such as data blanks, asterisks, or binary zeros may be trimmed from data records using the method 400.

The depicted record trimming method 400 includes a scan control statements step 410, a determine length step 420, a scan record step 430, a matching test 440, a modify length step 450, and an output step 460. The scan control statements step 410 scans the control statements associated with a set of data records(not shown). In one embodiment, the scan control statements step 410 includes locating one or more trimming control parameters within the scanned control statements.

As depicted, the record trimming method 400 proceeds from the scan control statements step 410 to the determine length step 420. The determine length step 420 determines the length of the record currently being processed. In one embodiment, the length of the record may be determined from a record descriptor word contained within the data record.

As depicted, upon completion of the determine length step 420, the record trimming method 400 proceeds from the determine length step 420 to the scan record step 430. The scan record step 430 scans from the end of the record beginning with the last data element. The matching test 440 determines if the value of the scanned data element matches a specified value. In one embodiment, the specified value is a value specified in the trimming control parameters.

If the value of the data element in the scanned record does not match the specified value, the record trimming method 400 proceeds to the output step 460 in order to output the (untrimmed) record. If the value of the data element in the scanned record matches the specified value, the depicted trimming method 400 loops to the scan record step 430 via the modify length step 450. In one embodiment, the modify length step 450 is accomplished by decrementing a value in the record descriptor. In an alternate embodiment, the modify length step 450 is accomplished by decrementing a register containing the record length.

As depicted, the modify length step 450 modifies the record length each time a value in the scanned record matches the value specified in the trimming control parameters. The scan, test, and modify loop (comprising steps 430, 440, and 450) continues until a data element of the scanned record has a value that is not identical to the specified value.

In response to finding a data element value that is not identical to the specified value, the record trimming method 400 discontinues looping and proceeds to the output step 460 in order to output the data record. In one embodiment, the output step 460 includes outputting the data record and modified record length to a file. In an alternate embodiment, a register contains the modified record length and the output step 460 further includes updating the record descriptor with the modified record length. Upon completion of the output step 460, the depicted record trimming method 400 terminates.

Figure 5:
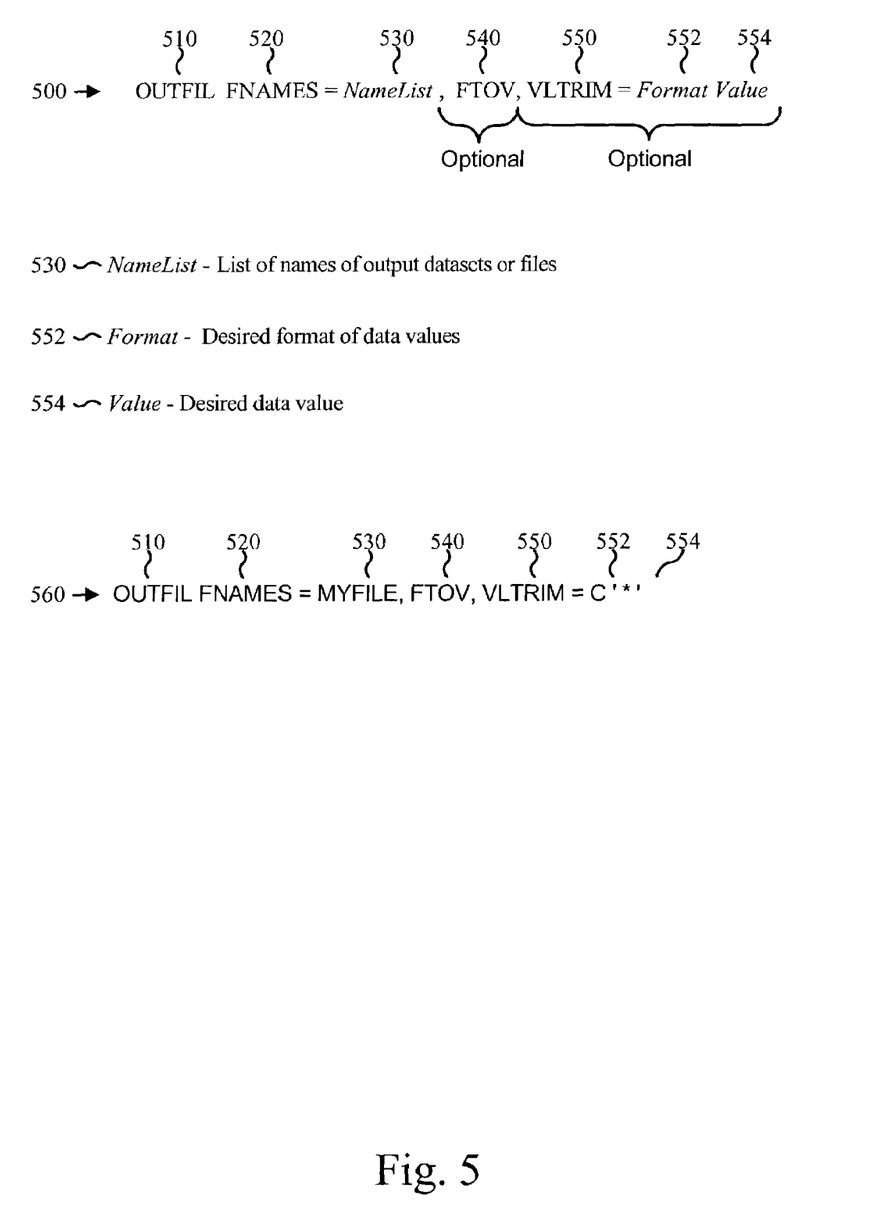
FIG. 5 is a text-based diagram illustrating an example of the syntax of one embodiment of a record trimming control statement of the present invention.

FIG. 5 is a text-based diagram illustrating an example of the syntax of one embodiment of a control statement 500 of the present invention. For illustration purposes, the depicted syntax is shown in a simplified form. A more detailed description of the depicted syntax is contained within release 14 of IBM®'s "DFSORT Application Programming Guide" which is incorporated herein by reference.

The control statement 500 specifies various options and parameters related to the record trimming module 395. The depicted control statement 500 includes a command indicator 510, a namelist command 520, a namelist 530, a conversion indicator 540, a trim indicator 550 including a format indicator 552, and a value indicator 554. Also depicted in FIG. 5 is an example of a record trimming control statement 560.

The command indicator 510 specifies the type of processing to be performed on a file. In the depicted embodiment, the command indicator is the keyword OUTFIL specifying the creation of an output file. The namelist command 520, which in the depicted embodiment is the keyword FNAMES, specifies that a namelist 530 of output files follows a delimiter, which in the depicted embodiment is an equal sign. In one embodiment, the namelist 530 may be a single name or a list of names separated by commas and enclosed within parenthesis.

The optional conversion indicator 540 indicates the type of conversion to be performed on the input file which in the depicted embodiment is a file with a reserved name such as 'SORTIN'. In the depicted example, the conversion indicator is the keyword FTOV indicating conversion of fixed-length records to variable-length records in order to facilitate record trimming. If the records in the input file are variable-length records, the FTOV keyword need not be included.

The trim indicator 550 specifies that data elements having a specified value are to be trimmed from the records within the input file. The depicted trim indicator 550 includes the format indicator 552 and the value indicator 554. The format indicator 552 specifies the format of the value indicator 554. The value indicator 554 specifies the data value to be removed from the input file.

The depicted control statement 560 converts the fixed-length records of the input file 'SORTIN' (not shown) to variable-length records, trims off trailing asterisk characters from each record, and places the trimmed records within the output file 'MYFILE'. In the depicted example, the command indicator 510 is the keyword 'OUTFIL', indicating that data records are to be directed to an output file, the namelist command 520 is the keyword 'FNAMES', and the output namelist 530 is 'MYFILE' indicating that the trimmed records are to be placed within a single output file named 'MYFILE'.

Furthermore, in the depicted example, the conversion indicator 540 is specified by the control word 'FTOV', indicating the conversion of fixed-length input records to variable length output records, and the trim indicator 550 is 'VLTRIM' indicating that trailing data elements having a specified value are to be removed from the records of the standard input file 'SORTIN'. In the depicted example, the format indicator 552 is specified by a formatting character 'C' indicating a text character is to follow and the value indicator 554 is specified by the symbol '*', indicating that trailing asterisk characters are to be removed from the records of the standard input file 'SORTIN'.

Figure 6:
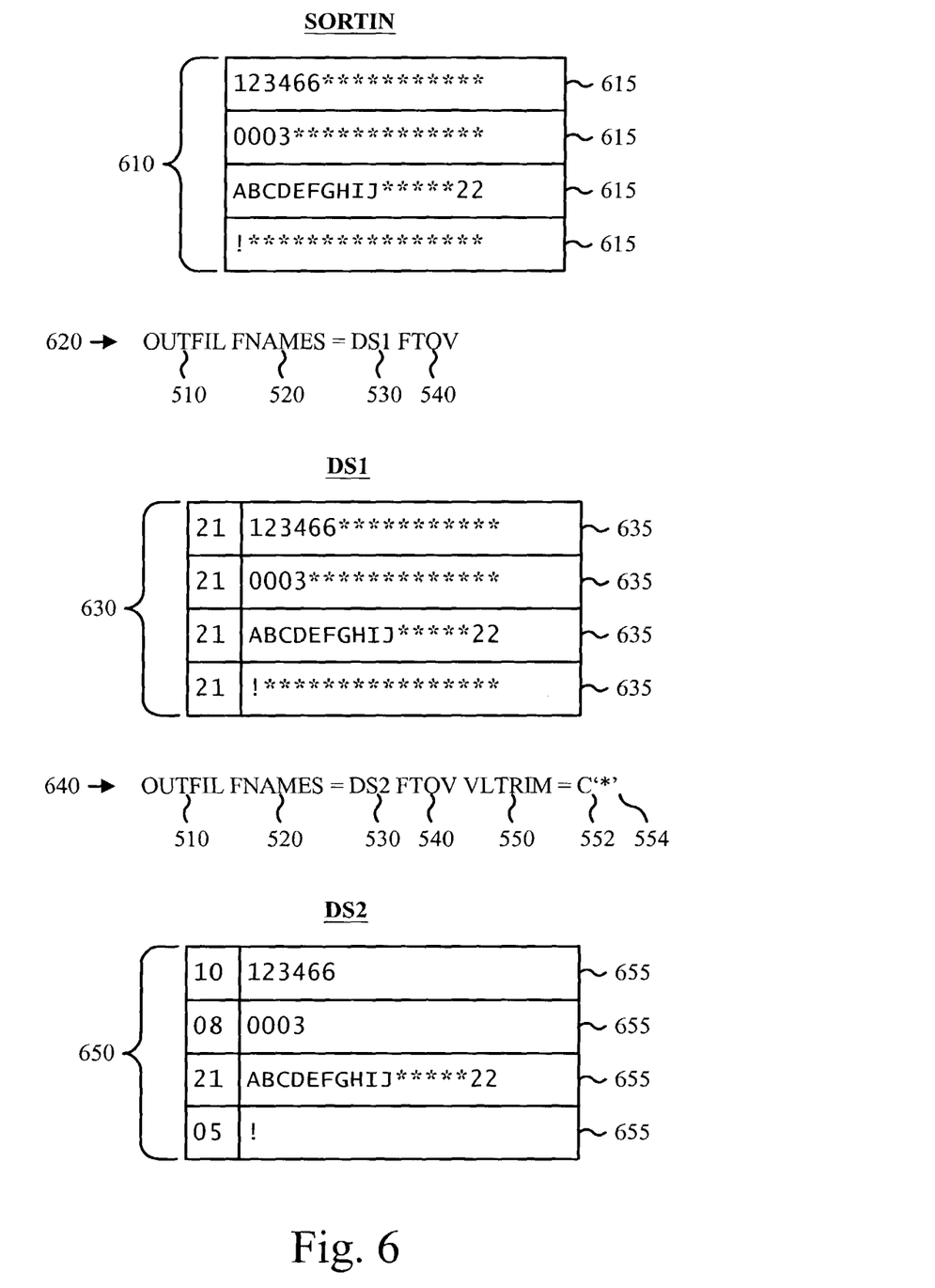
FIG. 6 is a text-based diagram illustrating various examples of trimmed data records.

FIG. 6 is a block diagram illustrating several examples of data records processed by the record trimming method 400 in conjunction with the control statement 500. In the depicted examples, an input file 610 containing several fixed-length data records 615 is processed as directed by a control statement 620, and a control statement 640 to produce, respectively, an output file 630 and an output file 650. The presented examples show the versatility and utility of the present invention.

In the depicted example, the input file 610, the output file 630, and the output file 650 are referenced, respectively, as 'SORTIN', 'DS1', and 'DS2'. The depicted control statement 620 indicates that the records within a standard input file named 'SORTIN' are to be processed and placed within a file named 'DS1'. Furthermore, as indicated by the conversion indicator 540, fixed-length records are to be converted to variable-length records.

As depicted, the processed records 635 within the output file 630 show the effect of processing the input records 615 within the input file 610 as directed by the control statement 620. Likewise, the processed records 655 within the output file 650 show the effect of processing the input records 615 within the input file 610 as directed by the control statement 630.

As depicted, the control statement 620 indicates that the records within the standard input file named 'SORTIN' are to be processed and placed within a file named 'DS2'. Furthermore, as indicated by the conversion indicator 540 (i.e. 'FTOV') the fixed-length records are to be converted to variable-length records. Likewise, trailing asterisk characters are to be trimmed from the records as specified by the trim indicator 550, the format indicator 552, and the value indicator 554.

As described above, the present invention facilitates trimming data records within applications such as a pipelined sort utility. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for trimming data elements matching a specified value from data records, the method comprising:
    scanning control statements associated with a set of fixed-length data records;
    finding at least one trimming control parameter within the control statements;
    converting the data records from fixed-length to variable-length data records;
    scanning from the end of a data record until a data element does not match a value specified by the at least one trimming control parameter;
    modifying a record length associated with the data record, wherein the control statements are job control language (JCL) statements; and
    sorting the set of data records, and wherein the operations of scanning control statements, finding at least one trimming control parameter, converting the data records, scanning from the end of a data record, modifying a record length, and sorting the set of data records are performed by successive stages of a data pipeline.

2. The method of claim 1, wherein the operations of modifying a record and sorting are performed by DFSORT on a mainframe computer.

3. The method of claim 2, further comprising storing the at least one trimming control parameter in readily accessible locations.

4. The method of claim 2, further comprising copying and storing the record within at least one register.

5. An apparatus for trimming specified trailing values from a record associated with a set of data records, the apparatus comprising:
    means for scanning control statements associated with a set of data records;
    means for concurrently processing the data records at successive stages of a data pipeline;
    means for finding at least one trimming control parameter within the control statements at a first stage of the data pipeline;
    means for sorting the set of data records at a second stage of the data pipeline; and
    means for scanning backwards from the end of the record until a current value does not match a value specified by the at least one trimming control parameter at a third stage of the data pipeline, wherein the control statements are job control language (JCL) statements, and wherein the means for scanning control statements, finding at least one trimming control parameter, converting the data records, scanning from the end of a data record, modifying a record length, and sorting the set of data records comprise successive stages of the data pipeline.

6. The apparatus of claim 5, further comprising means for storing the at least one trimming control parameter in readily accessible locations.

7. The apparatus of claim 5, further comprising means for determining the length of the record.

8. The apparatus of claim 5, further comprising means for copying and storing the record within at least one register.

9. A system for processing data records, the system comprising:
    a computer configured to process data records; and
    a utility that executes on the computer for concurrently processing data records at successive stages of a data pipeline, the utility comprising a parser configured to scan control statements and find at least one trimming control parameter referenced in the control statements, and a record trimming module configured to eliminate trailing values within data records, wherein the scanning and trimming are executed concurrently at distinct stages of the data pipeline, the utility further comprising a scanning module for scanning from the end of a data record until a data element does not match a value specified by the at least one trimming control parameter, a modifying module for modifying a record length associated with the data record, and a sorting module for sorting the set of data records, wherein the control statements are job control language (JCL) statements, and wherein the scanning control statements, finding at least one trimming control parameter, scanning from the end of a data record, modifying a record length, and sorting the set of data records are performed by successive stages of the data pipeline.

10. The system of claim 9, wherein the record trimming module is further configured to determine the length of data records.

11. The system of claim 9, wherein the record trimming module is further configured to scan a data record backwards.

12. The system of claim 9, wherein the record trimming module is further configured to remove values matching a value specified in the at least one trimming control parameter.

13. The system of claim 9, wherein the record trimming module is further configured to modify a record length.

14. The system of claim 9, wherein the record trimming module is further configured to decrement the record length.

15. The system of claim 9, wherein the record trimming module is further configured to scan the data record backwards until a value does not match a value specified in the at least one trimming control parameter.

16. A method for trimming data elements matching a specified value from data records, the method comprising:
scanning control statements associated with a set of data records;
finding at least one trimming control parameter within the control statements;
scanning from the end of a data record until a data element does not match a value specified by the at least one trimming control parameter;
modifying a record length associated with the data record; and
sorting the set of data records, and wherein the operations of scanning control statements, wherein the control statements are job control language (JCL) statements, and wherein the scanning control statements, finding at least one trimming control parameter, scanning from the end of a data record, modifying a record length, and sorting the set of data records are performed by successive stages of a data pipeline.

17. A computer readable storage medium comprising computer readable program code for trimming trailing values from data records, the program code configured to:
scan control statements associated with a set of data records;
sort the set of data records using a DFSORT utility;
find at least one trimming control parameter referenced in the control statements;
determine the length of a data record;
scan the data record backwards starting at the last data element;
eliminate each data element having a value that matches a value specified by the at least one trimming control parameter;
modify a record length associated with the data record; and
sort the set of data records, wherein the control statements are job control language (JCL) statements, and wherein the scanning control statements, finding at least one trimming control parameter, scanning the data backwards, modifying a record length, and sorting the set of data records are performed by successive stages of a data pipeline.

18. The computer readable storage medium of claim 17, wherein the code is configured to execute at successive stages of a data.

* * * * *